US007636792B1

(12) United States Patent
Ho

(10) Patent No.: US 7,636,792 B1
(45) Date of Patent: Dec. 22, 2009

(54) METHODS AND SYSTEMS FOR DYNAMIC AND AUTOMATIC CONTENT CREATION FOR MOBILE DEVICES

(75) Inventor: Alexander Channing Ho, Singapore (SG)

(73) Assignee: Oracle International Corporation, Redwood Shores, CA (US)

( * ) Notice: Subject to any disclaimer, the term of this patent is extended or adjusted under 35 U.S.C. 154(b) by 621 days.

(21) Appl. No.: 09/905,117

(22) Filed: Jul. 13, 2001

(51) Int. Cl.
G06F 15/16 (2006.01)
(52) U.S. Cl. ............... 709/246; 709/200; 709/203; 709/223; 709/227; 370/331; 370/352; 370/338; 455/403
(58) Field of Classification Search ......... 709/224–226, 709/204–208, 217, 238, 245–246, 219, 202, 709/200, 228, 223, 203, 218, 227; 395/200; 707/101–102, 10; 345/619; 341/50; 370/338, 370/401; 455/415, 566; 379/202.01, 215; 348/14.01, 14
See application file for complete search history.

(56) References Cited

U.S. PATENT DOCUMENTS

| 5,706,507 | A  | * | 1/1998 | Schloss ............. 707/104.1 |
| 6,073,168 | A  | * | 6/2000 | Mighdoll et al. ...... 709/217 |
| 6,233,618 | B1 | * | 5/2001 | Shannon ............. 709/229 |
| 6,343,318 | B1 | * | 1/2002 | Hawkins et al. ....... 709/219 |
| 6,397,259 | B1 | * | 5/2002 | Lincke et al. ........ 709/236 |
| 6,407,680 | B1 | * | 6/2002 | Lai et al. ............. 341/50 |
| 6,590,588 | B2 | * | 7/2003 | Lincke et al. ........ 345/744 |
| 6,601,098 | B1 | * | 7/2003 | Case et al. ........... 709/224 |
| 6,615,212 | B1 | * | 9/2003 | Dutta et al. ............ 707/10 |
| 6,622,157 | B1 | * | 9/2003 | Heddaya et al. ....... 709/202 |
| 6,658,463 | B1 | * | 12/2003 | Dillon et al. ........ 709/219 |
| 6,745,229 | B1 | * | 6/2004 | Gobin et al. ......... 709/206 |
| 6,922,721 | B1 | * | 7/2005 | Minborg et al. ...... 709/219 |
| 6,930,987 | B1 | * | 8/2005 | Fukuda et al. ........ 370/328 |
| 6,950,881 | B1 | * | 9/2005 | Ndili ................. 709/246 |
| 7,024,464 | B1 | * | 4/2006 | Lusher et al. ........ 709/219 |
| 7,028,102 | B1 | * | 4/2006 | Larsson et al. ....... 709/246 |
| 2002/0103881 | A1 | * | 8/2002 | Granade et al. ...... 709/218 |
| 2002/0156833 | A1 | * | 10/2002 | Maurya et al. ....... 709/203 |

(Continued)

FOREIGN PATENT DOCUMENTS

WO    WO 01/27711 A2    4/2001

OTHER PUBLICATIONS

Fielding et al., RFC 2616 HTTP/1.1 Standards, The Internet Society, Jun. 1999; 171 pages, (website link: http://www.ietf.org/rfc/rfc2616.txt).*

(Continued)

Primary Examiner—Jude J Jean Gilles
(74) Attorney, Agent, or Firm—Townsend and Townsend and Crew LLP

(57) ABSTRACT

A computer system and method configured to deliver content to a mobile device includes a first server configured to deliver an address of a content in a reference format responsive to a request for the content from the mobile device and a first proxy server configured to receive, from the mobile device, the address of the content in the reference format and a type of the mobile device. The proxy server is configured to fetch the requested content at the received address, to automatically convert the fetched content from the reference format to a format suitable to the type of mobile device and to deliver the converted content to the mobile device.

32 Claims, 5 Drawing Sheets

U.S. PATENT DOCUMENTS

2002/0173907 A1* 11/2002 Ando .................... 701/209
2004/0170155 A1* 9/2004 Omar et al. ............ 370/349

OTHER PUBLICATIONS

Fox, Amando, Gribble, Steven D., Brewer, Eric A. and Amir, Elan, *Adapting To Network And Client Variability Via On-Demand Dynamic Distillation*, pp. 1-11, University of California at Berkeley.

Fox, Amando and Brewer Eric A., Fifth International World Wide Web Conference, May 6-10, 1996 Paris, France, *Reducing WWW Latency And Bandwidth Requirements By Real-Time Distillation*, pp. 1-14, World Wide Web http://www5conf.inria.fr/fich_html/papers/P48/Overview.html (Printed on May 23, 2001).

* cited by examiner

400

| TYPE OF MOBILE DEVICE 402 | IMAGE FORMAT 404 | WIDTH (in pixels) 406 | HEIGHT (in pixels) 408 | ... |
|---|---|---|---|---|
| ERICSSON R320/R1A 410 | NONE | 200 | | |
| VoxML 412 | JPEG | | | |
| MOZILLA / 3.0 414 | JPEG, BMP | 75 | | |
| MOZILLA / 4.0 416 | | | | |
| ... | | | | |
| DEFAULT 418 | WBMP | 100 | 90 | |

*FIG. 4*

METHODS AND SYSTEMS FOR DYNAMIC AND AUTOMATIC CONTENT CREATION FOR MOBILE DEVICES

BACKGROUND OF THE INVENTION

1. Field of the Invention

The present invention relates generally to the dynamic creation of content for mobile devices. More particularly, the present invention relates to methods and systems for dynamically delivering various content such as images, audio and video to any type of mobile device, irrespective of file format supported thereby and the display characteristics thereof.

2. Description of the Related Art

The network of computers known as the Internet has made a great deal of information available to users, particularly in the form of World Wide Web (hereafter, Web) pages. This information is typically formatted for browsers based upon Hypertext Markup Language (HTML), which was designed for machines with a large screen and powerful input mechanisms, such as keyboards, mouse and touch screens, for example.

There is, however, an emerging class of mobile and/or wireless devices that are capable of displaying data. These include mobile phones with browsers based upon the Wireless Markup Language (WML) protocol, interactive pagers, and handheld Personal Digital Assistants (PDAs), for example. Such devices support a wide variety of file formats and standards. Moreover, such devices have relatively smaller screens and limited input capabilities, as compared to full-fledged desktop computing devices.

As each mobile device may support different file formats and have different display characteristics (such as screen size, resolution, color support, number of colors supported, etc.) it is difficult, time intensive and costly to timely convert even a fraction of the content present on the Web into a format that is suitable to each of the mobile devices in existence as well as those currently being developed.

The current generation of mobile devices incorporates a data-based browser; WML is one example, HDML and CHTML are other examples that are popular in different parts of the world. The browser is configured to make a request for content to a content server and the requested content (which may include text and/or image in future multimedia applications—plug-ins, etc.) is returned to the browser by the content server. Whereas desktop computing devices often have large screen capable of displaying a variety of image types (such as JPEG, GIF, PNG, etc.), mobile (e.g., wireless) devices typically have only a small screen that may be capable of displaying as little as two to four lines of text. One protocol used by wireless device to connect is the Wireless Application Protocol (WAP). WAP defines an image format for wireless devices known as Wireless Bitmap format (WBMP) defined by the WAP-190-WAE specification, incorporated herein by reference. Most first-generation "Internet-Ready" mobile devices only support WBMP, which may not be supported by typical desktop browsers.

FIG. 1 is a block diagram of a conventional system for providing content to mobile devices. As shown therein, a server 104 is coupled to a network 102, such as the Internet. Also shown at 116, 118 and 120 are Web sites, such as may be accessed by desktop computers or other Internet appliances. A number of mobile wireless devices are also coupled to the network 102, such as interactive pager 108, PDA 110 or mobile telephones 112 and 114. Each of these mobile devices may support different file formats and may have different display characteristics. Note, however, that wireless content need not originate from Web sites. Indeed, wireless content may originate, for example, from email, databases, directories or any computer software application. To deliver versions of the Web sites 116, 118 and 120 to the mobile devices 108, 110, 112 and 114, multiple versions of the Web sites 116, 118 and 120 must be maintained by the server 104. That is, the server 104 must conventionally store a separate version of each Web site for each mobile device 108, 110, 112 and 114, unless two or more mobile devices share the same display characteristics and support the same file format(s), language, etc. In fact, a single file (such as an image), might be pre-converted and stored prior to any user request by any of the mobile devices 108, 110, 112 and 114 and stored many times in various formats, such as color or black and white; black on white or white on black, GIF or WBMP. Moreover, these same files may required to be stored in multiple sizes for each of the mobile devices 108, 110, 112 and 114. This state of affairs is illustrated in FIG. 1 at 106, which references a database in which images from the Web sites 116, 118 and 120 have been pre-converted and stored therein in a format suitable for each of the mobile devices 108, 110, 112 and 114 (shown in dashed lines to indicate the type of mobile device to which each displayed image is suited).

Another disadvantage of the system of FIG. 1 is the server's ability to decide which file format to use in response to a request for content. Indeed, when a mobile device, such as shown at 108, 110, 112 or 114 makes a request for content, the server 104 (or whatever device or process that fields the request) must, in addition to the file format, decide in what size and aspect ratio to deliver the requested content. For example, how does the server 104 determine whether the requesting mobile device 108, 110, 112 or 114 has a screen measuring 100 by 50 pixels or 300 by 100 pixels (thus requiring the same image, but in a larger size)? One prior solution to this problem has been to use alternate addresses for the content suited to each mobile device. However, such as solution does not alleviate the need to pre-convert (typically even before any mobile device has requested the file) and store multiple versions of the same file. Accordingly, using the Hyper Text Transfer Protocol (HTTP), a mobile device 108 might be configured to request content from the Universal Resource Locator (URL) http://server.domain.com/wireless/file.device108, which will return a file "file.device108" that includes a reference to the image to be displayed on the mobile device 108; namely, http://server.domain.com/images/picture.device108. Likewise, mobile device 112 might be configured to request content (such as images and/or text, for example) from the URL http://server.domain.com/wireless/file.device112, which will return a file "file.device112" that includes a reference to the image to be displayed on the mobile device 112; namely, http://server.domain.com/images/picture.device108.

As "Internet Ready" mobile devices become the norm and as new devices are introduced into the marketplace (each potentially with its own unique combination of supported file formats and display characteristics), the burden of maintaining the database of pre-converted images 106 becomes unduly burdensome. Such a file delivery model does not scale well and will eventually become untenable, both functionally and economically.

What are needed, therefore, are methods and systems for more efficiently delivering content to mobile devices, irrespective of the display characteristics thereof and the file format supported.

SUMMARY OF THE INVENTION

It is, therefore, an object of the present invention to provide methods and systems for efficiently delivering content to mobile devices, irrespective of the display characteristics thereof and the file format(s) supported.

Accordingly, a method for delivering content to a mobile device, comprises the steps of receiving a first request for content from the mobile device; responsive to the first request for content, sending to the mobile device an address of the requested content in a reference format; receiving a second request from the mobile device for the content, the second request specifying an address of the requested content and a type of the mobile device; responsive to the second request, fetching the requested content in the reference format from the specified address and converting the fetched content from the reference format to a format suitable to the mobile device, and delivering the converted content to the mobile device.

According to further embodiments, the first receiving step and the sending step may be carried out by a first server and the second receiving step and the fetching and converting steps may be carried out by a second server. The second server may be a software module (such as a JAVA language servlet, for example) and the software module may run on the first server. The software module may run on one or more third servers that are distinct form the first server. The second server may include hardware. The first sending step may send the address of the requested content within a base file. The address may include a Universal Resource Locator (URL) of the requested content.

The converting step may carry out one or more of the following steps: re-sizing the requested content; converting the requested content from color to black and white; cropping the requested content; dithering the requested content, flipping the requested content and changing the number of colors. A step of storing a copy of the converted content in a cache memory may also be carried out. The delivering step may deliver the content from the cache memory if a valid copy of the converted content is present in the cache memory. The type of mobile device may include make and model information of the mobile device, such as Ericsson R320/R1A, for example. The second server may store a configuration table that associates the type of mobile device with display characteristics of the mobile device. Accordingly, the converting step may include a step of accessing the configuration table and converting the requested content to the format specified by the display characteristics associated with the type of the mobile device. The requested content may include an image and the converting step may include a step of changing the resolution of the image. Moreover, the delivering step may deliver the converted content to the mobile device at a selectable bit rate. The content may be or include images, video, audio, audio stream and video stream, for example, or any media that may be rendered upon the mobile or wireless device. The reference format may be different for each type of content. The second server may be a software module and the address of the content in the reference format may be passed as an argument to the software module.

The present invention is also a computer system configured to deliver content to a mobile device, comprising a first server configured to deliver an address of a content in a reference format responsive to a request for the content from the mobile device, and a first proxy server configured to receive, from the mobile device, the address of the content in the reference format (in a base file, for example) and a type of the mobile device, to fetch the content at the received address, to convert the fetched content from the reference format to a format suitable to the type of mobile device and to deliver the converted content to the mobile device.

BRIEF DESCRIPTION OF THE DRAWINGS

For a further understanding of the objects and advantages of the present invention, reference should be had to the following detailed description, taken in conjunction with the accompanying figures, wherein:

FIG. 4 shows a configuration table suitable for use with the present invention, according to an embodiment thereof.

DESCRIPTION OF THE INVENTION

Functional Description

Figure 2:
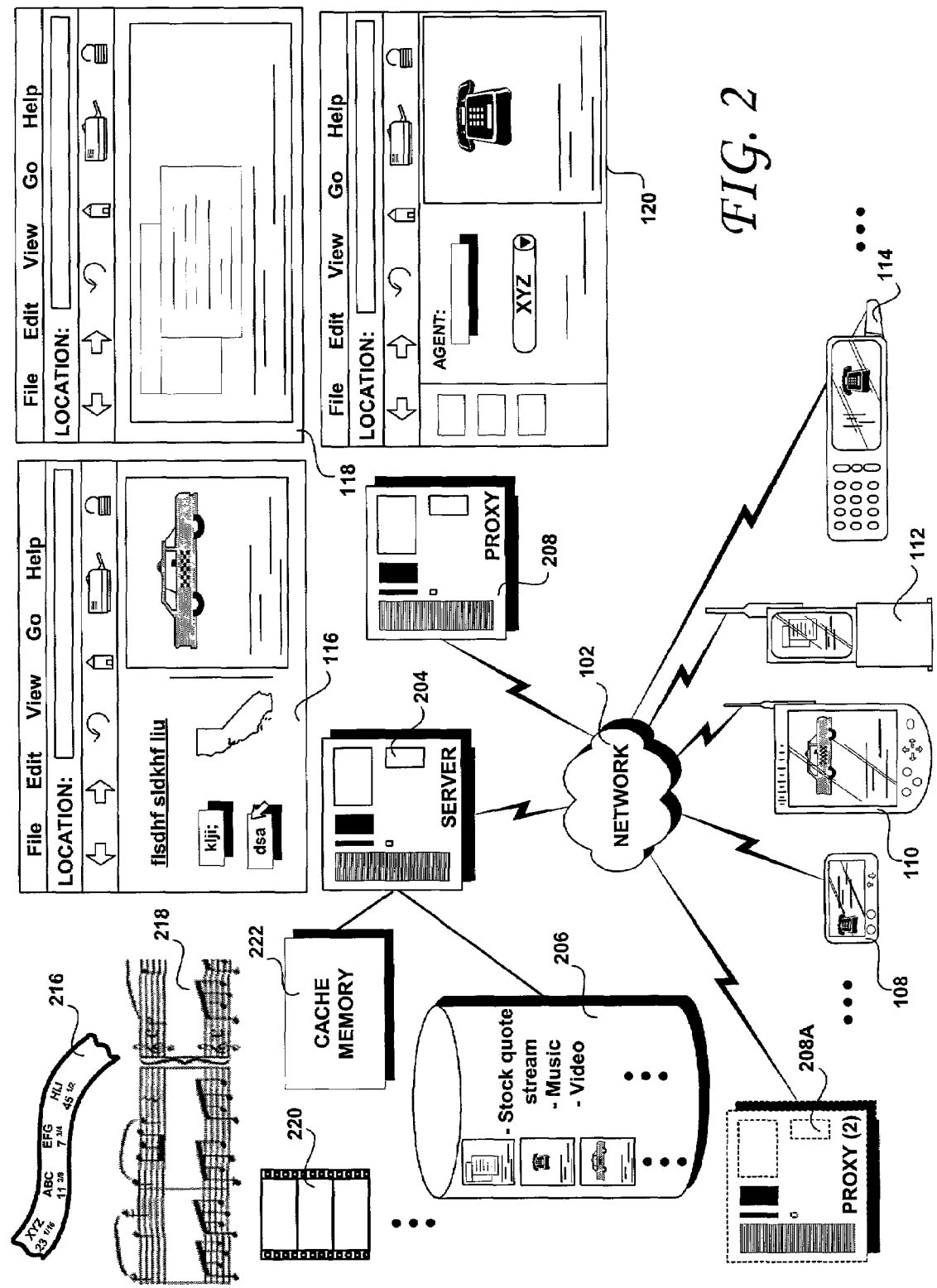
FIG. 2 is a block diagram of a system for providing content to mobile devices, according to the present invention.

FIG. 2 is a block diagram of a system for providing content to mobile devices, according to the present invention. As shown therein, a content server 204 is coupled to a computer network 102 that may include, for example, the Internet. A database 206 may also be coupled and/or accessible to the server 204. One or more mobile devices, examples of which are shown at reference numbers 108, 110, 112 and 114 are configured with some browsing ability and are also configured to access the network 102. Such devices may be configured for two-way communication with the server 204. However, the present invention is also applicable to one-way (read-only) devices (devices that are only capable of one-way communication or that are selectively configured for one-way communication) where some external mechanism causes data to be sent and received by the one-way devices. Such one-way devices may be configured, for example to notify the device owner of some specific event (such as, for example, the price for a given stock reaching a predetermined threshold). The user of such a one-way device has previously pre-registered with or otherwise configured the content provider so that the provider knows the kind of device to be notified and hence how to format the content. Also coupled to the network 102 is a proxy server 208, to be described in detail below.

Figure 1:
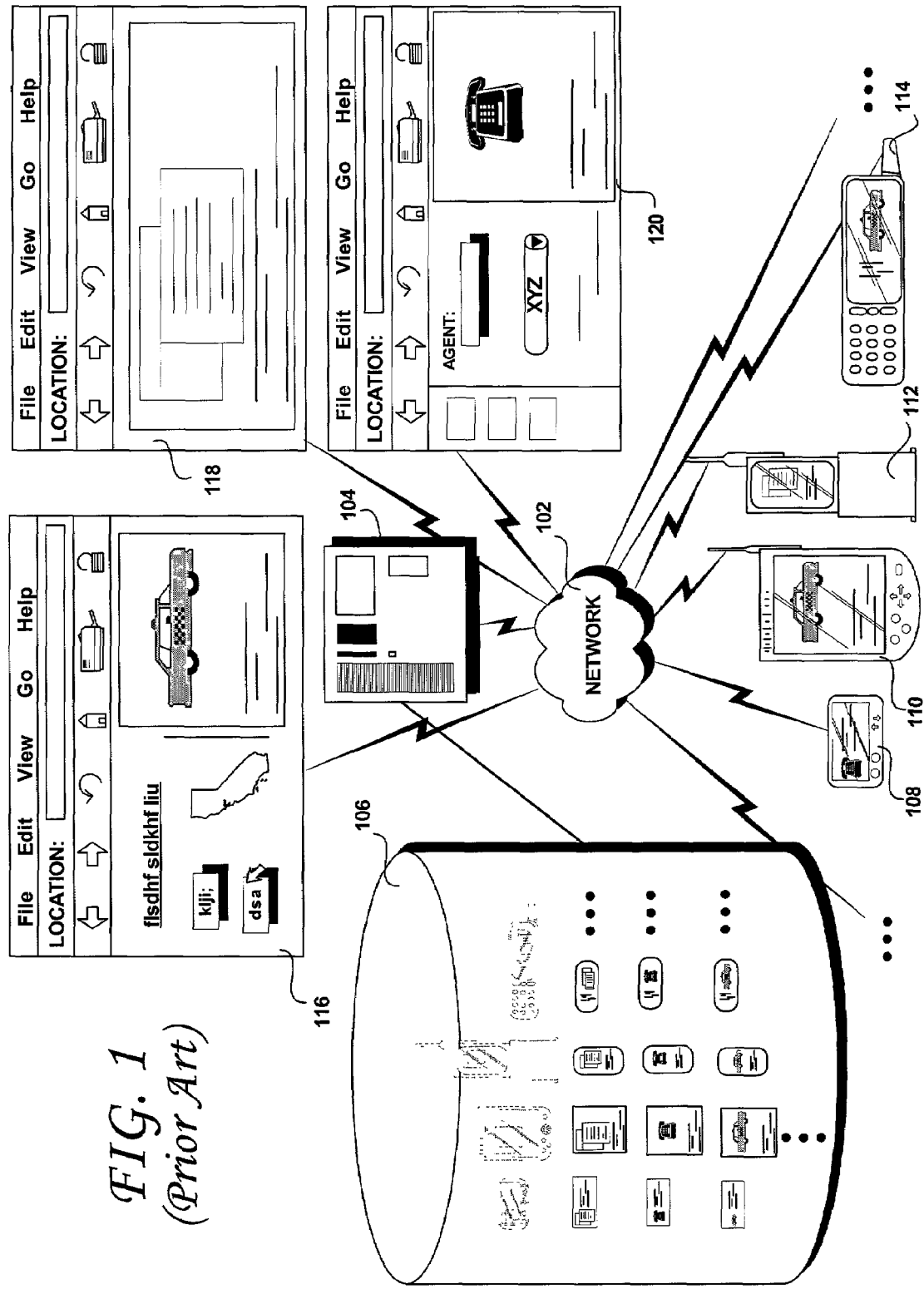
FIG. 1 is a block diagram of a conventional system for providing content to mobile devices.

The present invention provides a method for application developers and content providers (for example) to support a wide variety of mobile devices 108, 110, 112 and 114. According to the present invention, instead of a mobile device 108, 110, 112 or 114 requesting content (such as images, text, audio or video, for example) directly from a server (such as server 104 in FIG. 1), the mobile device 108, 110, 112 or 114 requests the content from the proxy server 208. It is then the proxy server 208 that obtains the content requested by the mobile device 108, 110, 112 or 114 from the server 204. According to the present invention, the server 204 may store a single copy of the content, this single copy being formatted according to some selected reference format. Thereafter, the proxy server 208 may re-format or otherwise re-configure the content from the reference format in which it is stored by the server 204 into a format suitable to the requesting mobile device 108, 110, 112 or 114. The proxy server may then deliver the re-formatted content to the mobile device 108, 110, 112 or 114 having made the request therefor. If the reference format of the requested content matches the file format supported by the mobile device 108, 110, 112 or 114, no conversion may be required, although some other manipulation may still be required to, for example, resize the requested content according to the display characteristics of the requesting mobile device 108, 110, 112 or 114.

As shown, the server 204, instead of delivering the requested content to the mobile device 108, 110, 112 or 114, may be configured to deliver a reference to or an address of the requested content in a reference format. The address of the requested content in the reference format may be within the domain of the proxy server, or may be anywhere within the network 102. The reference format, moreover, may be any selected format (such as WBMP or JPEG for images or MP3 for audio files, for example). Advantageously, the server 204 may send the mobile device 108, 110, 112 or 114 the reference or address of the requested content within a base file, along with any other information that may be required by the mobile device 108, 110, 112 or 114 to render the requested content. For example, the address of the requested content sent by the server 204 to the mobile device 108, 110, 112 or 114 may include a Universal Resource Locator (URL) of the requested content.

Upon receipt thereof, the mobile device 108, 110, 112 or 114 may then parse and render the base file, which base file contains a reference to or the address of the requested content in a reference format. The mobile device 108, 110, 112 or 114 passes the received address of the requested content to the proxy server 208, together with information identifying the type (such as make and model, for example) of the requesting mobile device 108, 110, 112 or 114. The proxy server 208 may then receive this request and fetches the requested content at the received address. After having received the content from the address passed to it by the mobile device 108, 110, 112 or 114, the proxy server 208 may then automatically convert the fetched content from the reference format to a format suitable to the type of mobile device 108, 110, 112 or 114 and may deliver the converted content to the mobile device 108, 110, 112 or 114. Therefore, if the reference format (for images) is JPEG and the image format suitable to the requesting mobile device 108, 110, 112 or 114 is WBMP, the proxy server 208, having retrieved the JPEG image from the address passed to it by the mobile device 108, 110, 112 or 114, converts the JPEG image to WBMP and delivers the converted image to the requesting mobile device 108, 110, 112 or 114. Such a conversion step may also (or alternatively) perform manipulations upon the requested image to re-size it, to convert it from color to black and white or from black and white to color, to crop it, to dither it, to flip it or to change the numbers of colors thereof, for example.

According to the present invention, the proxy server 208 may be a software process running on the server 204. Alternatively, the proxy server 208 may be a software process that runs on a server that is distinct from the server 204. According to one embodiment, a plurality of proxy servers 208 (one of which is shown at 208A in FIG. 2) may run on a corresponding plurality of servers, which may be geographically separated from one another. Alternatively still, the proxy server or servers 208 may be implemented in hardware (and suitable software).

According to the present invention, content (in whatever form, such as images from Web sites 116, 118 or 120, audio such as music 218, video 220, streaming content such as audio, video or stock quotes 216 to identify but a few representative examples) need not be converted into a mobile device specific format until and if requested by a particular mobile device 108, 110, 112 or 114. It is understood, however, that the present invention does not preclude pre-converting (e.g., prior to a request therefor by a mobile device 108, 110, 112 or 114) some frequently requested content prior to a request therefor, particularly if the proxy server is idle and storage requirements are sufficient to store such pre-converted content. However, the present invention does not require repeatedly converting the same content into the same format in order to service multiple requests therefor by like mobile devices. Indeed, once having converted the requested content from the reference format to a format specific to the requesting mobile device 108, 110, 112 or 114, the proxy server 208 may cause a copy of the converted content to be stored in a cache memory, such as shown at 222. Well-known cache management techniques may then be used to invalidate stale content (i.e., cached content that is too old and that is not up to date). The proxy server 208, in this manner, may be configured to deliver the requested content from the cache memory 222 instead of re-converting the content if a valid copy of the converted content is present in the cache memory 222, thereby reducing the load on the server 204.

Figure 3:
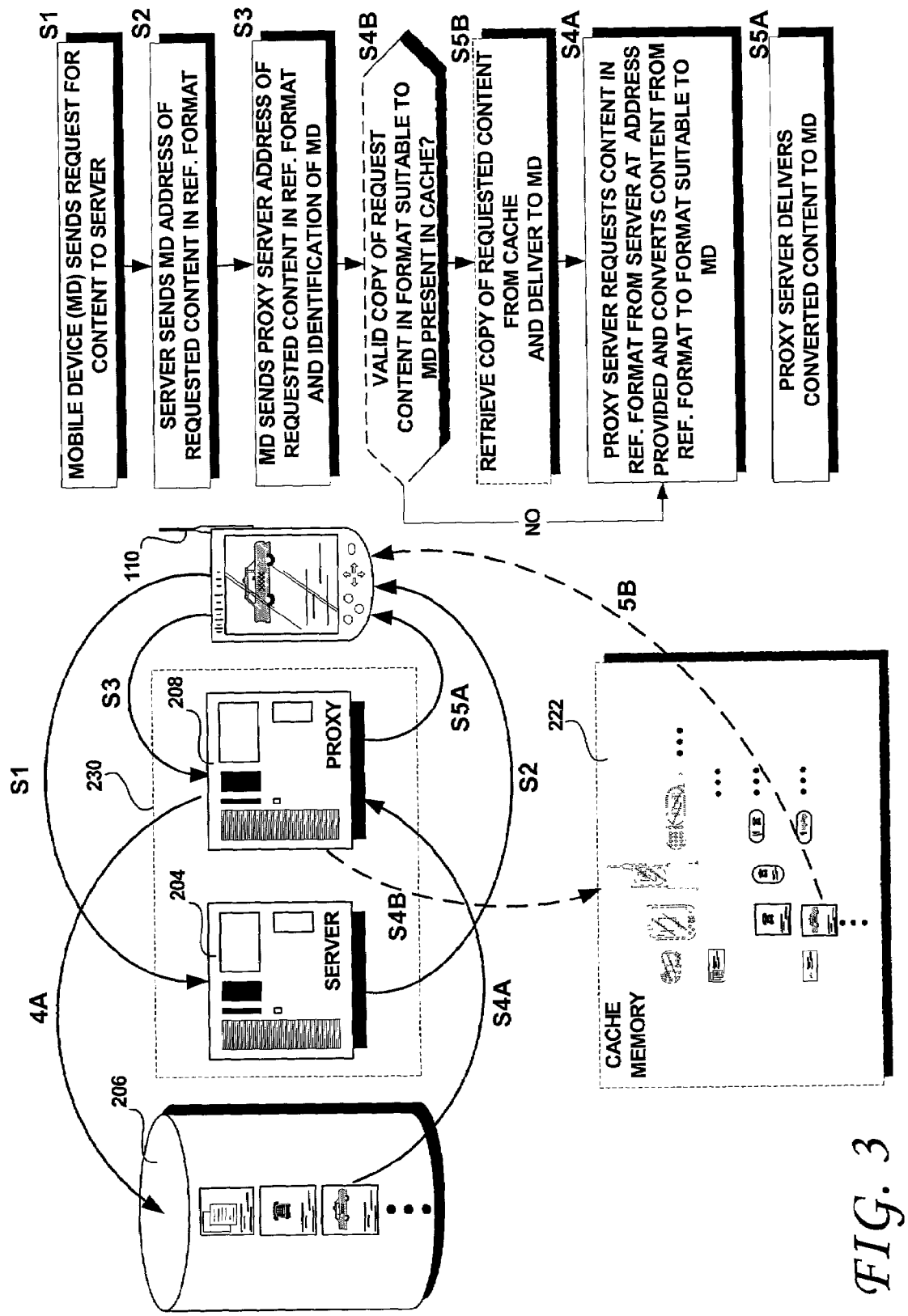
FIG. 3 includes a flowchart and a block diagram illustrating aspects of the present method for delivering content to a mobile device, according to an embodiment of the present invention.

FIG. 3 includes a flowchart and a corresponding block diagram illustrating aspects of the present method for delivering content (such as an image of a taxicab and associated text from a Web site, for example) to a mobile and/or fixed wireless device 110, according to an embodiment of the present invention. Step S1 calls for the mobile device 110 to request content from the server 204. Such a request may take the form of an HTTP request, such as http://server.domain.com/wireless/file.base. In response thereto, the server 204 returns the file "file.base" to the mobile device 110. The wireless device 110 then renders the file "file.base", which contains a reference (an address such as a URL, for example) of the content (in a reference format) requested by the mobile device 110. For example, the reference to the requested content (provided by the server 204 to the mobile device 110) may take the form of http://proxy.domain.com/images/image.reference, which is the address, on the proxy server 208 of the requested content (the "image.reference" file) in the reference format. It is to be understood that the "image.reference" file need not reside on the proxy server 208, but may reside on a different server altogether, whereupon the address of the requested content would point to that server, and not the proxy server 208. This request then goes to the proxy server 208, along with at least an identification of the type of the mobile device 110, as shown at S3. There are at least two portions to this request: the file containing the content requested by the mobile device 110 and the identification of the device type. According to an embodiment of the present invention, the file requested by the mobile device 110 is identified by the URL and the device type may be available from the HTTP header. Indeed, when a browser requests a file from a server using the HTTP protocol, it transmits more than just the URL of the requested file. There are a number of additional fields that are sent from the browser to the server that are not typically seen by the end user. These include languages that the browser is prepared to handle as well as a field known as the "User-Agent". The User-Agent field may be used to identify the type of device being used to connect to the server. Therefore, the type of mobile device making the request for content may be coded within the User-Agent field in the HTTP header of the request, although other implementations are possible. As shown at S4A, the proxy server 208 may then request the content (the "image.reference" file in the reference format) from the server 204. The server 204 may then return the requested content to the proxy server 208, which may then automatically convert the "image.reference" from the reference format to a format suitable to the mobile device 110, based upon the received mobile device type information received in the HTTP header. As shown at S5A, the proxy server 208 may then deliver the converted image (which may be called "image.mobiledevicetype110") to the mobile device 110, which suitably formatted image may then be rendered thereon.

If a cache memory such as shown at 222 is present, step S4B may be carried out, in which the proxy server 208 checks the cache memory 222 for a valid copy of the previously converted and stored "image.mobiledevicetype110". If a valid copy of the requested content in a format suitable for the mobile device 110 is present in the cache memory 222, it may be retrieved therefrom as shown at S5B and thereafter delivered to the mobile device 110, as shown at S5B. If the copy of the requested content stored in the cache memory 222 is stale or if the requested content in a format suitable to the mobile device 110 is not present in the cache 222, then step S4A may be performed, as described above. Thereafter, a copy of the converted content (the device-specific content image.mobiledevicetype110) may be stored in the cache memory 222.

Assuming that another mobile device, such as shown at 108 in FIG. 2, requests the same content, the proxy server 208 may request the same content in the reference format ("image.reference") from the server 204 and convert the content from the reference format to a format suitable to the mobile device 108 and deliver the converted content to the mobile device 108, as detailed with respect to steps S4A and S4B or S5A and S5B.

Advantageously, the proxy server 208 may maintain a configuration table to enable it to associate received mobile device type information with the file format(s) supported by the requesting mobile device, as well as the size (in pixels, for example) of the mobile device's display. FIG. 4 shows an example of a configuration table suitable for use with the present invention, according to an embodiment thereof. The configuration table 400, for illustrative purposes only, includes only display information related to images. However, the configuration table may readily be extended to cover other types of content, such as voice, music, video etc. As shown, the configuration table 400 may include a column 402 for the type of mobile device, which information may be encoded in the User-Agent field of the HTTP header, as detailed above. Another column 404 may specify the image format supported by each of the listed mobile devices. For example, for mobile devices 108, 110, 112 or 114 that include a Mozilla-based browser as shown at rows 414 and 416, the supported image format may be specified to include JPEG. According to one embodiment of the present invention, when no image format is specified (such as is the case with the listed Ericsson R320/R1A mobile device shown in row 410), the proxy server may deliver the requested content in the default file format listed in the configuration table 400. In this case, the default file format is listed as being WBMP. As shown at row 412, in the case wherein the browser of the requesting mobile device supports the VoxML specification for interactive speech applications (or when the requesting mobile device does not have a display), no image may be transferred. The VoxML language is based on the W3C eXtensible Markup Language (XML) standard. The size of the display of the requesting mobile device 108, 110, 112 or 114 may also be specified in the configuration table 400. For example, images to be delivered to an Ericsson R320/R1A mobile device may be limited to a maximum of 200 pixels in width, whereas mobile devices supporting the Mozilla/4.0 browser may be limited to, for example, 75 pixels in width, as specified by the width column 406. As shown in the case of the Mozilla/4.0 device, mobile devices may be configured to support more than one image format, such as JPEG and BMP, for example. If no pixel dimensions for the display of the requesting mobile device 108, 110, 112 or 114 are specified, the configuration table may supply a default value (as shown in row 418) of, for example, 100 pixels in width and 90 pixels in length, as specified by the length column 408.

Regardless of the type of mobile device requesting the content from the server 204, the value stored in the User-Agent field may be overridden by specifying a specific file format and/or a specific size for the image to be displayed. In no User-Agent information is provided, default User-Agent information may be provided. For example, in the absence of the specification of a User-Agent, the proxy server 208 may perform the requisite conversion from the reference format to a selected default format, such as WBMP, assuming that the requesting device is a WML-enabled device, for example. When the requesting device does not support the selected default format, then the image requested by the mobile device 108, 110, 112 or 114 may be converted into, for example, an 8-bit grayscale image measuring 100 by 100 pixels.

Advantageously, the present invention makes it unnecessary to save (such as in the store 106) multiple copies of the same image (or other content) in different formats. This results in evident savings in storage space, but also significantly simplifies the provisioning process. The term "provisioning" is telephone company nomenclature for adding a new user to the telephone system. In conventional systems, each type of device had to be provisioned separately, as the telephone system needed to have a method of distinguishing between the different devices accessing the system. The present invention, in one illustrative (but non-limiting) embodiment thereof, makes use of the HTTP header (using the User-Agent field therein, for example), to communicate the mobile device type to the proxy server 208, thereby simplifying the provisioning process. This is particularly significant in the face of potentially millions of users. Indeed, new mobile or wireless devices are constantly being introduced to market. These mobile devices have different form factors including differently sized screens and may have the ability to support different file formats and colors, for example. Instead of having to generate a copy of all existing content to support the new device, the characteristics of the newly introduced mobile device may simply be added to the configuration table maintained by the proxy server 208, such as shown at 400 in FIG. 4. Moreover, when a new version of the content becomes available, a single copy thereof in a reference format may be stored in 206, there being no need to insure that all of the different copies of the content are updated, as would be necessary in the system shown in FIG. 1.

The server 204, according to the present invention, may readily support dynamic images; that is, images that are updated frequently. Such a dynamic image might be a snapshot of a constantly changing image such as generated by a Web-enabled traffic camera at a busy intersection, for example. To constantly maintain multiple copies of the image in a plurality of formats for a corresponding number of mobile devices is costly, not the least in terms of computational power. In the case of a traffic Web cam, the data that is generated and posted to a Web page may be one or more JPEG images that are updated at some interval (every minute, second, etc.), for example. According to the present invention, such JPEG images might only be converted on demand—that is, only when a mobile device 108, 110, 112 or 114 requests a picture of the traffic at the intersection.

According to another embodiment of the present invention, instead of referencing the content in the reference format in the URL of the server 208, the URL of the reference content may be stored as a variable, a value of which may be passed to the proxy server 208. Indeed, instead of referencing the content in the reference format as http://proxy.domain.com/images/image.reference, the following syntax may be used: http://proxy.domain.com/images?url=http://another.domain.com/image.reference, where "http://proxy.domain.com/images" is the address of the proxy server (or process or servlet—a small program that runs on a server) 208, where "url" is the name of the variable that is passed to the proxy server 208 and "http://another.domain.com/image.reference" is the URL of the reference image requested by the mobile device 108, 110, 112 or 114 on another server on the network 102. More than one argument may be passed to the proxy server 208, to cause the proxy server to carry out further manipulations upon the reference content such as (in the case of images) dither, crop, re-size and rotate, for example. Similarly, in the case wherein the content includes a music clip, audio manipulations may be carried out to, for example, boost low frequencies to enable the clip to sound richer when played back on a small sized speaker. This embodiment, therefore, enables the content in the reference format to be stored anywhere on the network (e.g., the Internet) and not (necessarily) locally to the proxy server 208. The server 204 and/or the proxy server 208 may be or include logical software modules and not hardware machines. They could co-exist on the same machine, as indicated at 230 in FIG. 3.

The conversion from the content in the reference format to a format suitable to the requesting mobile device 108, 110, 112 or 114 may vary according to environmental characteristics, such as the available bandwidth. Third generation wireless devices (usually referred to as "3G") may have a variable bandwidth. Indeed, the bit rate at which content is delivered to 3G devices may vary depending, for example, whether the device is moving or stationary. The present invention may readily support such a variable bit rate and may incorporate functionality to decimate the content to insure timely delivery thereof, even in the face of reduced bit rate constraints. For example, when the communication channel between the mobile device and the proxy server 208 is bandwidth limited, the conversion from the reference format may also lower the resolution of the image to be delivered to the mobile device 108, 110, 112 or 114, to keep download times relatively constant (or within permissible limits). Other factors may also be taken into account during the conversion from the reference format to the format supported by the requesting mobile device 108, 110, 112 or 114.

The present invention is advantageously applied to mobile devices of the type described relative to FIGS. 1-4. However, the present invention is equally applicable to fixed wireless devices and the phrase "fixed wireless device" may be substituted herein throughout for the phrase "mobile device". Moreover, the present invention is also applicable to devices that interface with television receivers or monitors (such as interactive TV Set Top Boxes) and/or other low-resolution display devices where image manipulation is an issue. The phrase "mobile device", within the context of the present invention, should also be understood to encompass such devices.

Hardware Description

Figure 5:
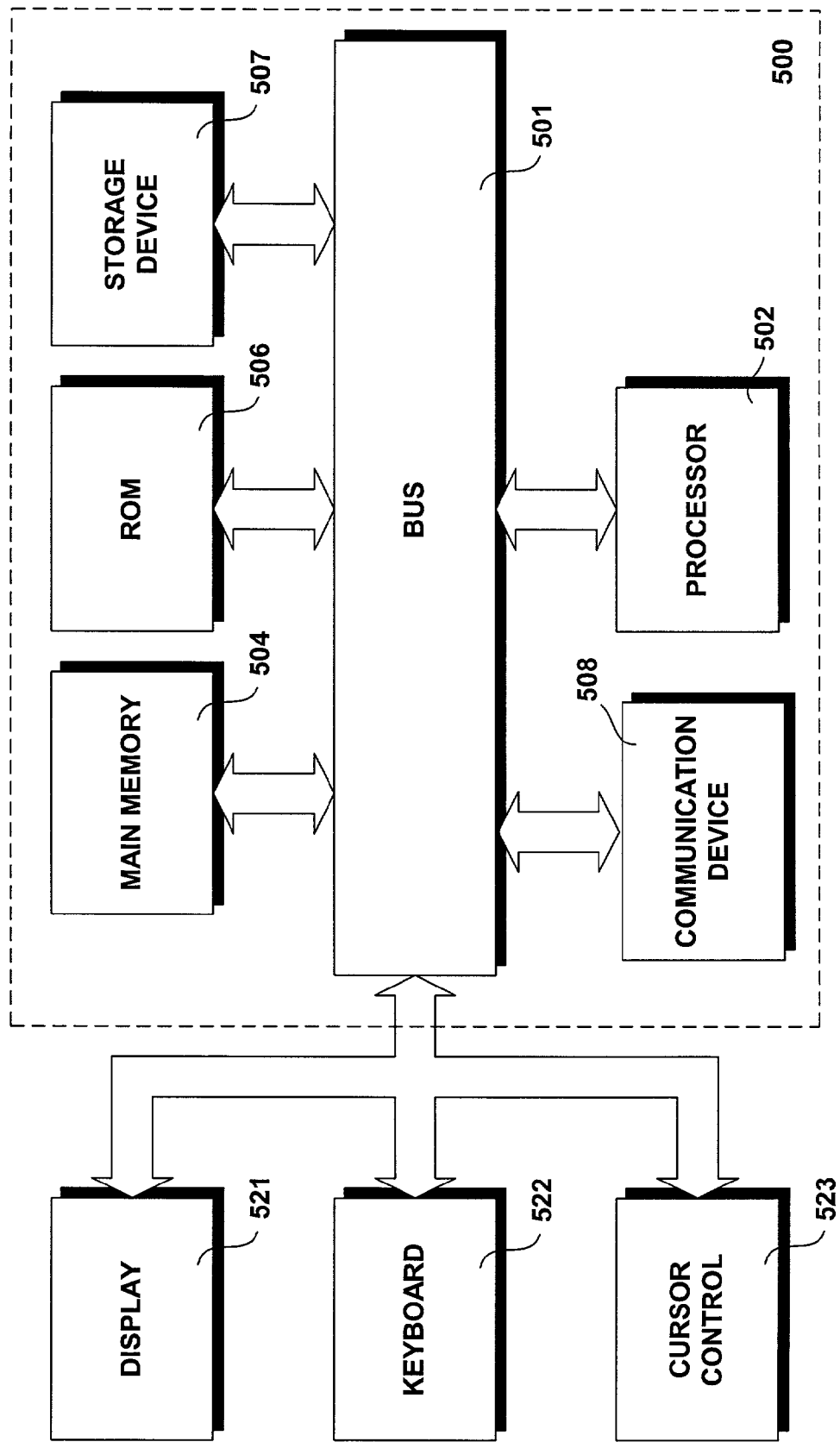
FIG. 5 is a block diagram of a computer with which the present invention may be practiced.

FIG. 5 illustrates a block diagram of a computing device 500 with which an embodiment of the present invention may be implemented. Computing device 500 (such as server 204, for example) includes a bus 501 or other communication mechanism for communicating information, and a processor 502 coupled with bus 501 for processing information. Computing device 500 further comprises a random access memory (RAM) or other dynamic storage device 504 (referred to as main memory), coupled to bus 501 for storing information and instructions to be executed by processor 502. Main memory 504 also may be used for storing temporary variables or other intermediate information during execution of instructions by processor 502. Computing device 500 may also include a read only memory (ROM) and/or other static storage device 506 coupled to bus 501 for storing static information and instructions for processor 502. A data storage device 507, such as a magnetic disk or optical disk, may be coupled to bus 501 for storing information and instructions. A communication device 508, such as a modem or network (such as Ethernet, for example) card is also coupled to the bus 401 to provide access to a network, such as shown at 102 in FIG. 1.

The computing device 500 may also be coupled via bus 501 to a display device 521, such as a cathode ray tube (CRT), for displaying information to a computer user. An alphanumeric input device 522, including alphanumeric and other keys, is typically coupled to bus 501 for communicating information and command selections to processor 502. Another type of user input device might be the user's own voice or cursor control 523, such as a mouse, a trackball, or cursor direction keys for communicating direction information and command selections to processor 502 and for controlling cursor movement on display 521.

The present invention is related to the use of computing device 500 configured to dynamically deliver content to mobile devices 108, 110, 112 or 114, as disclosed above. According to one embodiment, the processing may be carried out by one or more computing devices 500 in response to processor(s) 502 executing sequences of instructions contained in memory 504. Such instructions may be read into memory 504 from another computer-readable medium, such as data storage device 507 and/or from a remotely located server. Execution of the sequences of instructions contained in memory 504 causes processor(s) 502 to implement the functionality described above. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A method for delivering content to a mobile device, comprising the steps of:
    receiving, by a first server computer, a first request for content from the mobile device;
    responsive to the first request for content, sending, by the first server computer, an address to the mobile device of the requested content, the requested content stored in a reference format in a storage device accessible to one or more server computers at the address;
    receiving, by a second server computer, a second request for content from the mobile device subsequent to the first request for content, the second request for content received from the mobile device being different from the first request for content received from the mobile device, the second request for content specifying the address of the requested content sent to the mobile device responsive to the first request and a type of the mobile device;
    responsive only to the second request, fetching, by the second server computer, the requested content as stored in the reference format from the address of the requested content in the second request;
    determining, by the second server computer, one or more environmental characteristics applicable to delivery of the fetched content to the mobile device from the reference format in one or more formats suitable to the mobile device; and
    converting, by the second server computer, the fetched content from the reference format to a format suitable to the mobile device based on the one or more environmental characteristics applicable to delivery of the fetched content to the mobile device, and
    delivering the converted content to the mobile device.

2. The method of claim 1, wherein the second server computer includes hardware configured to convert the fetched content from the reference format to the format suitable to the mobile device based on the one or more environmental characteristics applicable to delivery of the fetched content to the mobile device.

3. The method of claim 1, wherein the first sending step sends the address of the requested content within a base file.

4. The method of claim 1, wherein the address includes a Universal Resource Locator (URL) of the requested content.

5. The method of claim 1, wherein the converting step carries out at least one of the following steps:
    re-sizing the requested content;
    converting the requested content from color to black and white;
    cropping the requested content;
    dithering the requested content,
    flipping the requested content, and
    changing a number of colors of the requested content.

6. The method of claim 1, further comprising a step of storing, by the second server computer, a copy of the converted content in a cache memory associated with the second server computer.

7. The method of claim 6, wherein the delivering step comprises delivering, by the second server computer, the copy of the converted content from the cache memory associated with the second server computer if a valid copy of the converted content is present in the cache memory.

8. The method of claim 1, wherein the type of mobile device includes make and model information of the mobile device.

9. The method of claim 1, further comprising storing, by the second server computer, a configuration table associating the type of mobile device with a set of display characteristics of the mobile device.

10. The method of claim 9, wherein the converting step includes:
    accessing, by the second server computer, the configuration table; and
    converting, by the second server computer, the fetched content from the reference format to the format suitable to the mobile device based on the one or more environmental characteristics applicable to deliver of the fetched content to the mobile device and a format specified by the set of display characteristics associated with the type of the mobile device.

11. The method of claim 1, wherein the requested content includes an image and wherein the converting step includes a step of changing the resolution of the image.

12. The method of claim 1, wherein the delivering step comprises delivering, by the second server computer, the converted content to the mobile device at a selectable bit rate defined, in part, by the one or more environmental characteristics.

13. The method of claim 9, wherein the content is of a type selected from a group including image, video, audio, audio stream and video stream.

14. The method of claim 13, wherein the reference format is different for each type of content.

15. The method of claim 1, wherein the second server computer includes a software module and wherein the address of the requested content in the reference format is passed as an argument via the second request for content to the software module.

16. A computer system configured to deliver content to a mobile device, comprising:
    a first server that includes hardware and that is configured to deliver, responsive to a first request for content from the mobile device, an address of the requested content to the mobile device, the requested content stored in a reference format in a storage device accessible to one or more server computers at the request, and
    a first proxy server configured to:
        receive a second request for content from the mobile device, the second request for content received from the mobile device being different from the first request for content received from the mobile device, the second request for content including the address of the requested content send to the mobile device responsive to the first request for content and a type of the mobile device,
        fetch the requested content as stored in the reference format at the address of the requested content in the second request responsive only to the second request,
        determine one or more environmental characteristics applicable to deliver of the fetched content to the mobile device from the reference format in one or more formats suitable to the mobile device,
        convert the fetched content from the reference format to a format suitable to the type of mobile device based on the one or more environmental characteristics applicable to delivery of the fetched content to the mobile device, and
        deliver the converted content to the mobile device,
    wherein the first proxy server is further configured to:
        maintain a configuration table associating the type of mobile device with a set of display characteristics of the mobile device, access the configuration table, and convert the fetched content from the reference format to the format suitable to mobile device using based on the one or more environmental characteristics applicable to delivery of the fetched content to the mobile device and a format specified by the set of display characteristics associated with the type of the mobile device.

17. The computer system of claim 16, wherein the first proxy server is a software module.

18. The computer system of claim 17, wherein the software module runs on the first server.

19. The computer system of claim 17, wherein the software module runs on at least one third server that is distinct form the first server.

20. The computer system of claim 16, wherein the first proxy server includes hardware.

21. The computer system of claim 20, wherein the first server and the first proxy server are coupled to one another by a computer network.

22. The computer system of claim 21, further including a plurality of second proxy servers each of the plurality of second proxy servers being configured as first proxy servers and being coupled to a computer network.

23. The computer system of claim 22, wherein at least some of the plurality of second proxy servers are geographically separated from one another.

24. The computer system of claim 16, wherein the first server is configured to send the address of the requested content within a base file.

25. The computer system of claim 16, wherein the address includes a Universal Resource Locator (URL) of the requested content.

26. The computer system of claim 16, wherein the first proxy server is also configured to selectively re-size the requested content, convert the requested content from color to black and white, crop the requested content, dither the requested content, flip the requested content or to change a number of colors of the requested content.

27. The computer system of claim 16, wherein the first proxy server is also configured to store a copy of the converted content in a cache memory.

28. The computer system of claim 27, wherein the first proxy server is configured to deliver the copy of the converted content from the cache memory if a valid copy of the converted content is present in the cache memory.

29. The computer system of claim 16, wherein the type of mobile device includes make and model information of the mobile device.

30. The computer system of claim 16, wherein the content is of a type selected from a group including image, video, audio, audio stream and video stream.

31. The computer system of claim 30, wherein the reference format is different for each type of content.

32. The computer system of claim 16, wherein the first proxy server is a software module and wherein the address of the content in the reference format is passed as an argument to the software module.

* * * * *

UNITED STATES PATENT AND TRADEMARK OFFICE
CERTIFICATE OF CORRECTION

| | |
|---|---|
| PATENT NO. | : 7,636,792 B1 |
| APPLICATION NO. | : 09/905117 |
| DATED | : December 22, 2009 |
| INVENTOR(S) | : Alexander Channing Ho |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 956 days.

Signed and Sealed this

Ninth Day of November, 2010

David J. Kappos
*Director of the United States Patent and Trademark Office*